US012613893B1

(12) United States Patent
Guha et al.

(10) Patent No.: US 12,613,893 B1
(45) Date of Patent: Apr. 28, 2026

(54) NATURAL LANGUAGE DATA QUERY SYSTEMS AND METHODS

(71) Applicant: SAP SE, Walldorf (DE)

(72) Inventors: Gautam Guha, Bangalore (IN); Santhosh Rao, Bangalore (IN); Sparshad Kasote, Pune (IN)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 18/930,263

(22) Filed: Oct. 29, 2024

(51) Int. Cl.
*G06F 17/00* (2019.01)
*G06F 7/00* (2006.01)
*G06F 16/334* (2025.01)
*G06N 20/00* (2019.01)

(52) U.S. Cl.
CPC ......... *G06F 16/3344* (2019.01); *G06N 20/00* (2019.01)

(58) Field of Classification Search
CPC ............................ G06F 16/3344; G06N 20/00
USPC .......................................................... 707/769
See application file for complete search history.

(56) References Cited

U.S. PATENT DOCUMENTS 6,741,959 B1 * 5/2004 Kaiser ................. G06F 16/3347 707/999.005
7,720,674 B2 5/2010 Kaiser et al.
8,862,458 B2 10/2014 Freising et al.
11,086,892 B1 8/2021 Paff et al.
11,531,675 B1 * 12/2022 Raghavan .............. G06N 20/00
11,775,861 B1 * 10/2023 Rajani ..................... H04L 51/52 706/12
11,860,916 B2 * 1/2024 Gutta .................... G06F 40/279
2009/0112835 A1 * 4/2009 Elder ...................... F16K 15/16
2014/0280045 A1 9/2014 Smolinski et al.
2016/0371379 A1 12/2016 Fang
2020/0301916 A1 * 9/2020 Nguyen .............. G06F 16/3344
2022/0004571 A1 * 1/2022 Ganapathy .......... G06F 16/3326
2024/0112074 A1 * 4/2024 Chisholm .............. G06N 20/00

* cited by examiner

*Primary Examiner* — Pavan Mamillapalli
(74) *Attorney, Agent, or Firm* — Fountainhead Law Group, PC

(57) ABSTRACT

Embodiments of the present disclosure include techniques for querying a data store using natural language inputs. A machine learning model is trained using NLP inputs, SQL queries, and metadata attributes of a data store. In some embodiments, training inputs may include UI code and visualizations. A user enters an NLP input and the machine learning model is used to tokenize the input and generate a query automatically. Query results are displayed in UI. Certain NLP inputs from the user are presented as links for a user to select and generate new queries.

20 Claims, 12 Drawing Sheets

Remove Irrelevant Keywords

( Show me )    ( sports car 216d )    ( product )

( lifecycle   data )  ( in )  ( tabular view )  ( where )

( start date )  ( between )  ( april 1, 2023 )  ( and )

( jan 31, 2024 )  ( group by )  ( phase name )

( sort )  ( start date )  ( in )  ( ascending order )

( and )  ( amount )  ( in )  ( descending order )

480

Create Query:

Show me _Sports Car 216D_ product lifecycle data. — 451

Show them in _Tabular View_ where _Start Date_ between _date 1, date 2_ and _date 3, date 4_. — 452, 453

Group by _Phase Name_.

Sort _Start Date_ by ascending order and _Amount_ by Descending order. — 454

Frequently Used Queries:

Purchase Order table...

Sales: Order table and Net value...

Top Customer by Net value...

Delay Impact vs Fulfillment Rate...

481

| Sports Car 216D | | | |
|---|---|---|---|
| Phase ID | Contact Person | Start Date | Amount (Local Currency) |
| **Phase 1** | | | |
| | Denise Smith | 11/15/22 | 12,897.00 |
| | Paul Blevins | 11/18/23 | 234,197.00 |
| **Phase 2** | | | |
| | Candice Brown | 11/21/22 | 1,497.00 |
| | Richard Wilson | 11/23/22 | 8,898.00 |
| | Denise Smith | 11/26/22 | 11,665.99 |
| | Paul Blevins | 11/25/23 | 13,127.00 |
| | Richard Wilson | 11/26/23 | 234,197.00 |
| **Phase 3** | | | |
| | Denise Smith | 12/03/22 | 12,897.00 |
| | Richard Wilson | 12/08/22 | 16,452.00 |
| | Paul Blevins | 12/12/23 | 234,127.00 |
| **Phase 4** | | | |
| | Richard Wilson | 12/12/22 | 499.99 |
| | Richard Wilson | 1/21/22 | 12,800.00 |
| | Candice Brown | 12/15/23 | 173,199.00 |

Display UI comprising input statement portion and output portion          701

Receive user input statement          702

Display user input statement in input statement portion of UI          703

Generate query from input statement          704

Display results in output portion of UI          705

Convert portion(s) of input statement to links to related tokens          706

Display tokens associated with one or more words of input statement in input statement portion of UI          707

Receive user selection of a token          708

Modify output portion of UI based on selected token          709

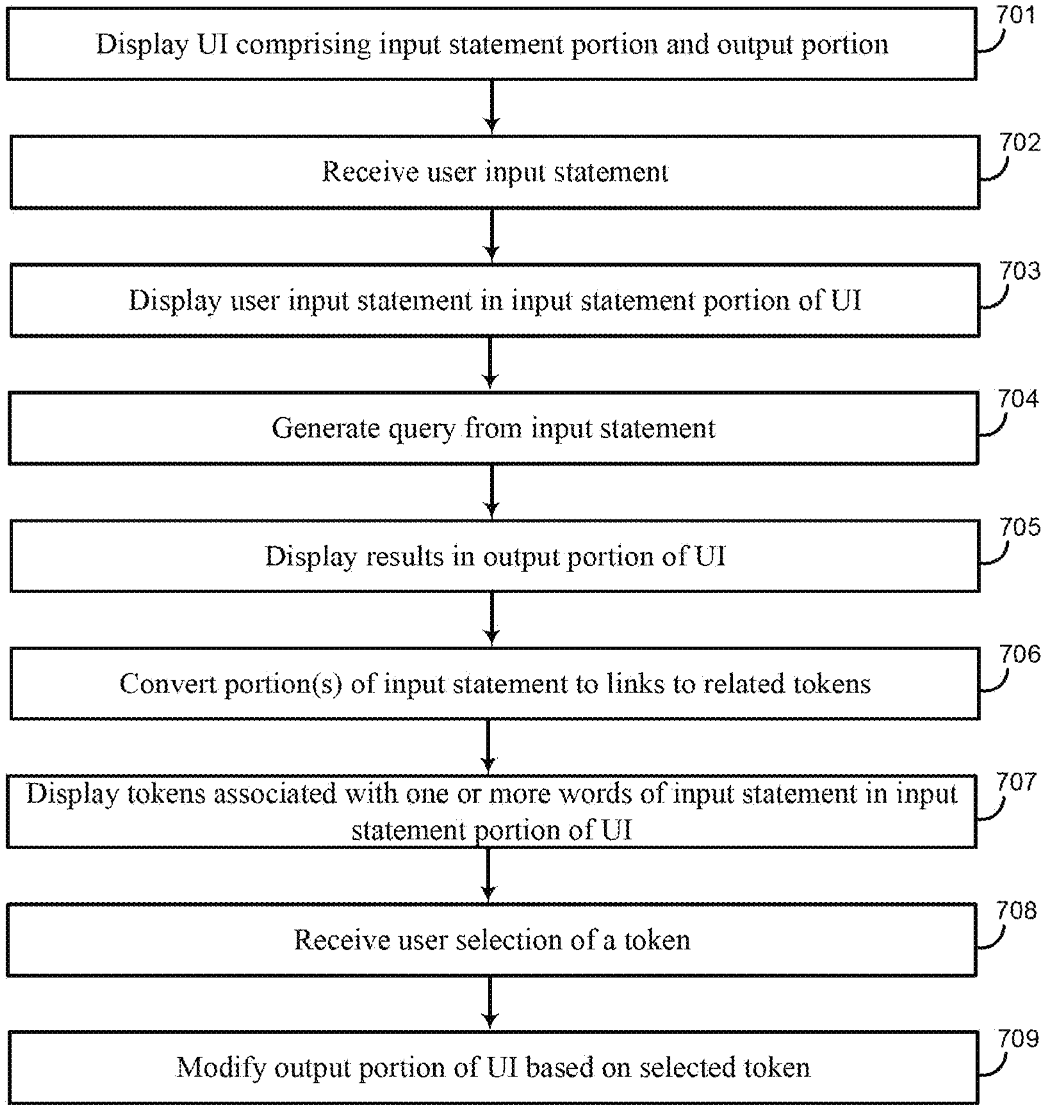

*Fig. 7*

NATURAL LANGUAGE DATA QUERY SYSTEMS AND METHODS

BACKGROUND

The present disclosure relates generally to data analysis, and in particular, to natural language data query systems and methods.

Enterprise applications often include large amounts of data and provide mechanisms for working efficiently with this data. Each data set and its users are different because of the data's changing context. Subject Matter Experts (SMEs) may gain expertise on where to look for which kind of data and what to analyze after spending many years on a specific domain.

Accessing, visualizing, and manipulating data is typically a manual time consuming process. This problem can be compounded by a potential gap between what an SME understands about a product or process, but is not a computer expert and may have difficulty executing tasks involving databases and computer systems. Thus, a more user-friendly interface is needed to bridge the gap between subject matter knowledge and computer-based queries and languages.

BRIEF DESCRIPTION OF THE DRAWINGS

FIG. 4C illustrates an example UI according to another embodiment.

FIG. 7 illustrates a process flow according to an embodiment.

DETAILED DESCRIPTION

Described herein are techniques for performing natural language queries. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
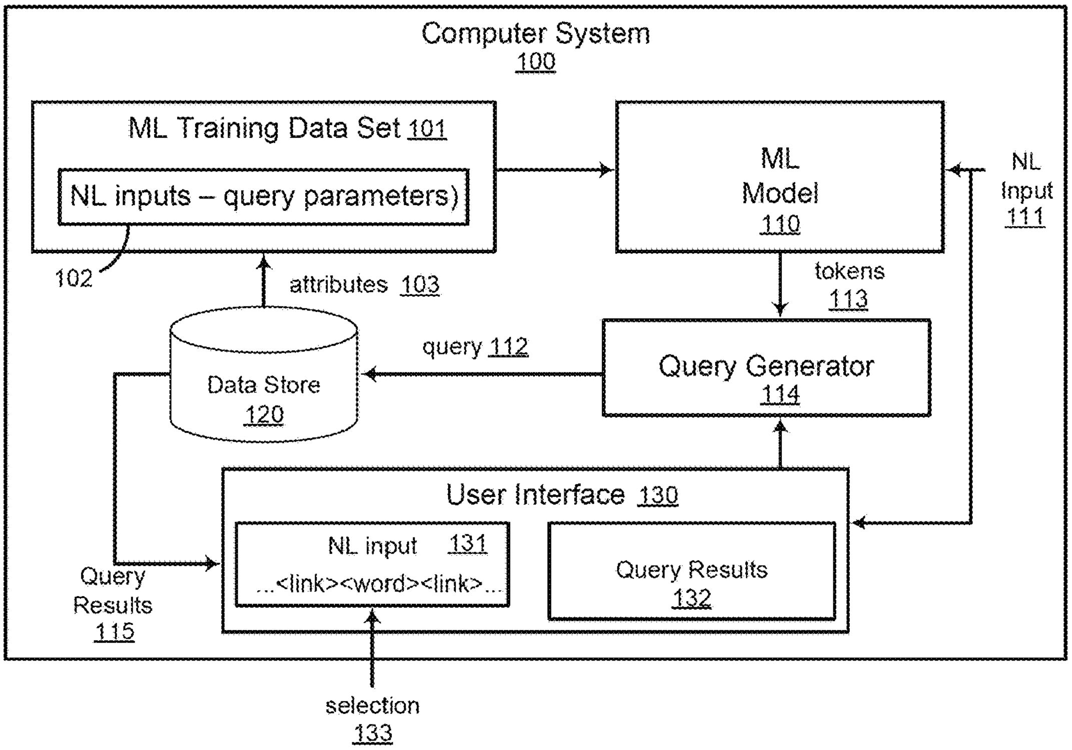
FIG. 1 illustrates a system for performing natural language queries according to an embodiment.

FIG. 1 illustrates a computer system 100 configured to perform natural language queries according to an embodiment. Features and advantages of the present disclosure include training a machine learning (ML) model 110 using natural language (NL) inputs and attributes of a data store. The ML model 110 may then receive an NL input and generate a query, which is displayed in a user interface (UI) 130. Certain recognized words of the NL input may be presented as links to related attributes for a user to select and query. Typically, searching data in a data store is technically challenging and often requires experts with advanced skills in query writing and data manipulation. Accordingly, features and advantages of the present disclosure may provide a unique solution to the technical problem of searching data in a data store, for example.

In this example, ML training data set 101 comprises sample NL inputs and corresponding query parameters 102 derived from attributes 103 from data store 120. Attributes 103 may comprise column names, data types, operations, and other aspects of how the data is stored in data store 120, for example. In some embodiments, data store 120 may be an analytic database, for example. For instance, training data 101 may include a plurality of natural language inputs to the analytic database and a corresponding plurality of SQL queries comprising attributes of the data (e.g., column names, data types, and operators) in the analytic database. ML model 110 may be trained with data set 101. For instance, ML model 110 may be trained to convert one or more words of the natural language inputs into tokens corresponding to the attributes (e.g., column names) in the analytic database and associate the tokens with other attributed (e.g., particular data types and operators).

Once the ML model 110 is trained, the tokens may be used by a query generator 114 to process natural language (NL) inputs 111 and produce queries 112. In this example, NL input 111 is received by ML 110. Query 112 (e.g., a SQL query) is generated based on an output of ML model 110. For example, the output may comprise tokens 113 corresponding to one or more words of NL input 111. Query 112 is processed in data store 120 to produce query results 115. Query results 115 are sent to a user interface (UI) 130 for display at 132. Additionally, the NL input 111 is sent to UI 130 for display. Advantageously, one or more words of NL input 111 corresponding to one or more tokens 113 identified by ML model 110 as a relevant attribute (e.g. a column name, data type, or operation) are displayed in a highlighted format (e.g., as one or more links). Each highlighted word (or group of words) may be associated with a plurality of corresponding attributes in data store 120. Accordingly, a user may select the highlighted word(s) to automatically generate a new query 112 to data store 120 to produce new query results 115 based on the selection, for example.

Figure 2:
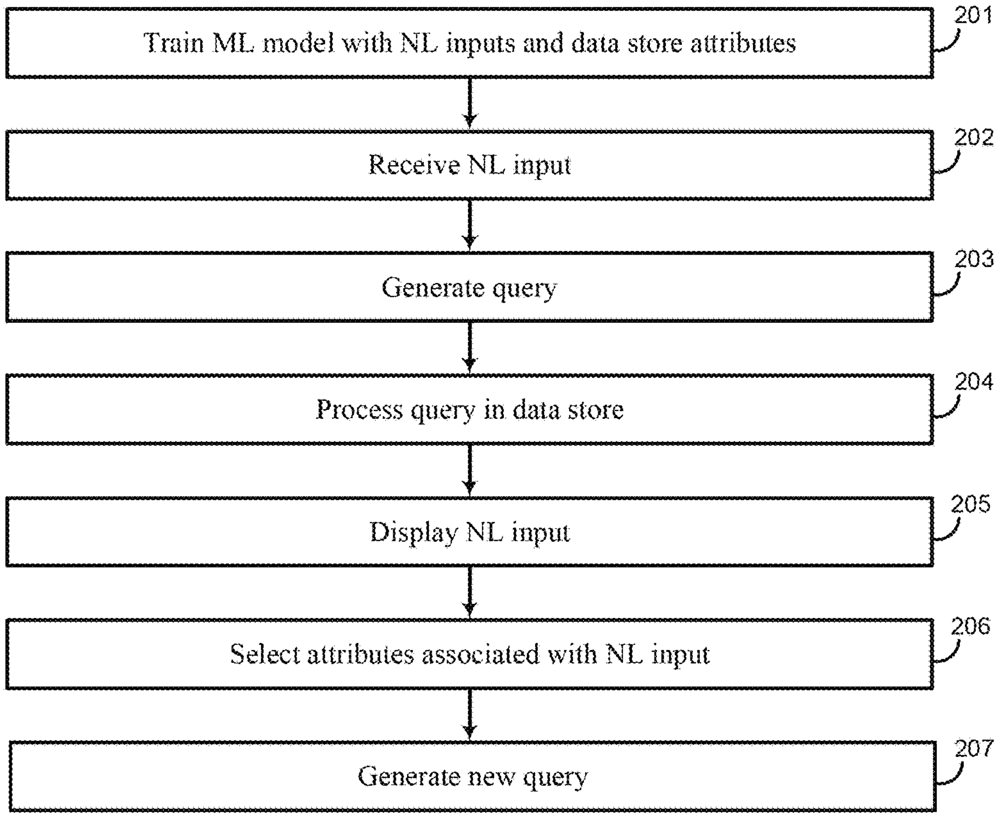
FIG. 2 illustrates a method performing natural language queries according to an embodiment.

FIG. 2 illustrates a method of performing natural language queries according to an embodiment. At 201, an ML model is trained with NL inputs and data store attributes, such as column names, data types, and operations, for example. At 202, an NL input is received. At 203, the ML model processes the NL input and a query is generated. At 204, the query is processed in the data store. At 205, the NL input is displayed to the user. Single words, or groupings of consecutive words, from the NL input may be associated with tokens corresponding to particular data store attributes by the ML model, for example. The UI may highlight words of the NL input that have corresponding recognized tokens. The highlighted words may have associated attributes that are available for selection, for example. Accordingly, a user may select an attribute associated with a particular word to modify the query. For example, if the NL query is directed at "sports cars," an attribute associated with the words "sports cars" in the UI may be "luxury cars." An initial search may return data about sports cars. If the user selects "luxury cars," then a new search may be initiated for luxury cars, for example. Thus, a new query is generated at 207.

Figure 3:
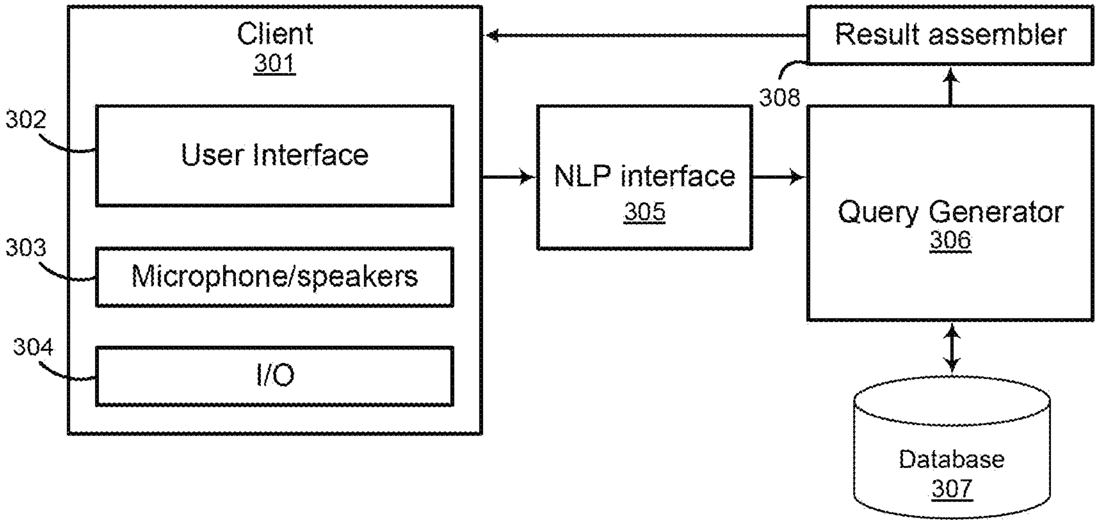
FIG. 3 illustrates an example system for performing natural language queries according to another embodiment.

FIG. 3 illustrates certain aspects of the present disclosure. FIG. 3 is an example system diagram for providing an improved user interface (UI) to a user. A user interacts with a UI 302 to input data and receive data from the computer system. UI 302 includes an auditory sub-system 303 (e.g., a microphone for receiving user speech commands and one or more speakers for the computer system to read aloud results to the user). UI 302 may also include visual sub-systems such as I/O 304, which may include one or more of a keyboard for a user to type commands into the computer system, a mouse for a user to select a command as displayed on a screen, a touchpad for receiving user input, and a screen for both displaying information to the user and, in some circumstances, receiving user input (e.g., a touchscreen). UI 302, auditory sub-system 303, and/or visual sub-system 304 may be part of a client computer system 301 (aka "client"), for example.

A user enters a computer command, such as a query for information, using UI 302. The user may use human natural language constructs to enter the command. That is, the user may type or speak in the user's native language what commands or information the user requires from the computer system. This input is transmitted to the Natural Language Processer (NLP) interface 305. In this way the user need not know specific computer or query languages to use the system. NLP interface 305 may perform several functions. One such operation is tokenization of the received input. This process includes breaking the received command into characters, words or phrases. The determined tokens are then processed by stemming or lemmatization. These processes associate each token to its corresponding root (e.g., the root for the received words "billing" or "billable" is "bill"). In addition, the tokens within the received input are also tagged where each token is associated with its relevant part of speech to distinguish verbs from nouns from adjectives, etc. Lexical analysis and semantic analysis may also be done by the NLP interface.

The NLP interface 305 forwards the user's input with the determinations it made regarding the input to the query generator 306. The query generator 306 forms a computer readable instruction for performing a query. In one example, it forms an SQL query from the received data from the NLP interface. As an example, this can include coupling terms (e.g., tokens) using relevant SQL commands (e.g., SELECT or JOIN) while dropping user words that are not relevant to the query (e.g., words such as "an" or "the," depending on the context of the query). Query generator includes a field index. In a row-oriented display, the fields are the column names where each row is a record with many fields in it.

Once the query is properly formed, it is forwarded to database 307 and results are returned. The results assembler 308 processes the results so they may be presented to the user in a legible format. For instance, the results can be displayed in a table form with rows and columns. The results assembler also forwards back to the UI 302 either the direct input of the user or, in the alternative, instructions to the UI to modify the user's input already provided to the computer system. If the user input is sent back to the UI, the results assembler highlights or changes the format of selected words in the user input. In one example, words in the user input that correspond to tokens, such as a field in the database, are highlighted in the presented UI. This highlighting can be text in a different format such as bold, italics, different font, different colors, or different size or it can include other highlights such as underlining or changing the background behind the text from one color (e.g., white) to another color (e.g. yellow).

The results assembler 308 also generates different display options to the user based on the highlighted token. As an example, if the results are displayed in one format, e.g., a table, wherein the word "table" is a token and therefore highlighted on the screen, if the user selects the word "table" via a mouse, touchscreen or equivalent, the UI is changed to provide a menu of other options of displaying data different from the table format (e.g., hierarchical). This provides several benefits to the user. First, the user need not know all the display options available. By providing a display of some or all available options in this system, the user can quickly select a different display option by interacting with the highlighted token in the earlier command or query. In the inverse, if other display options are simply unavailable, the associated token would not be highlighted. That is, if only table views are available in one particular system, the word "table" would not be highlighted in the display to the user indicating to the user that other display options are not available.

Figure 4A:
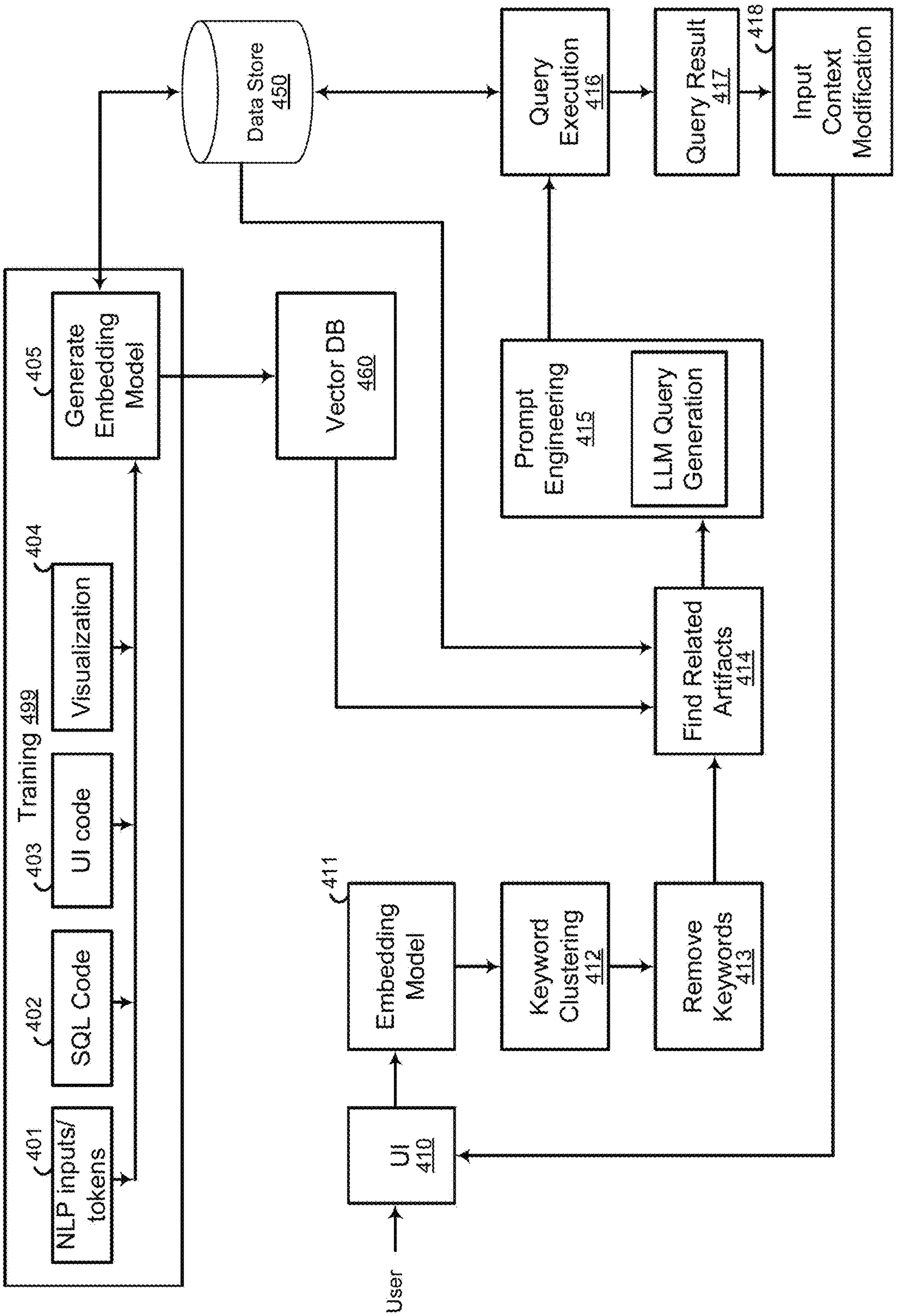
FIG. 4A illustrates an example system for performing natural language queries according to another embodiment.

FIG. 4A illustrates an example system for performing natural language queries according to another embodiment. In this example, the ML model includes an embedding model. Initially, certain inputs are used for training at 499 the embedding model. Training inputs may include natural language inputs (e.g., sample user inputs) and/or tokens (e.g., vectorized inputs and/or clusters) 401 and corresponding SQL code 402, UI code 403 (e.g., UI5 code, HTML code, or Java Script code), and/or data visualizations 404 (e.g., a table view, hierarchical view, network view, timeline view). Table views, hierarchical views, network views, timeline views are examples of different types of data visualization elements, which may be found in a UI framework or data visualization library like SAP UI5, D3.JS, for example. A network view (aka, network graph view) is a graphical representation of objects viewed as nodes (or vertices) that are connected with lines to show relationships with other objects. Tabular data can be visualized as network graphs for specific scenarios, for example. A timeline view is a visual representation of a chronological sequence of events along a drawn line that helps a viewer understand time relationship, for example.

Example input SQL code may be the following:

SELECT category, SUM (sales) FROM products GROUP BY category and salary >=50000 and salary <=10000 ORDER BY salary ASC, category DESC Example UI code for presenting query results to a user interface may be the following:

root: (branch: "br", details: "or details",
(branch: "Mech", details: "Mechanical Engg"},
|branch: "Elec", details: "Electrical Engg"}, Training inputs may further include information from the data store being queried, such as column names and other metadata from data store 450. The inputs are used to train an ML, which in this example comprises generating an embedding model. Training involves taking the training data and creating an embedding model, which generates word embeddings to convert both unsupervised and supervised data into vector representations. The "Generate Embedding Model" block 405 is part of the machine learning process. Embeddings represent words, phrases, or even entire documents as vectors in a continuous vector space. This allows for capturing semantic meaning and similarities between different pieces of text. Text data is transformed into a numerical format that can be easily processed by machine learning algorithms. The input is raw text data (e.g., sentences, documents, metadata etc.). In some embodiments, a pre-trained embedding model (e.g., Word2Vec, GloVe, or BERT) may be used to convert the text into vectors. The output comprises vectors representing the input text. For example, for an input sentence like "Show me Sports car 261D," the embedding model will convert each word into a vector. These vectors will have high-dimensional numerical values that encode the semantic meaning of the words. A trained embeddings model may generate vectors such that items related to each other are closer together in an N dimensional vector space than items that are not, allowing the system to predict a next token given a sequence of previous tokens, for example.

Next, embeddings and metadata may be stored in a vector database (DB) 460. In this step, the mapping of data, schema, and structures takes place, and the resultant information is sent to the vector database for storage. Additionally, metadata and keywords may be extracted from data store 450 and stored in the Vector DB 460. For one example application of cars, this may include storing Phase ID (ID of the phase of manufacturing of the car), Phase Name (name of the phase/step of the manufacturing process), Amount, Contact person, etc. Vector DB 460 stores the trained data generated by the embedding model and assists in processing natural language inputs. As mentioned above, a vector database is a type of database designed specifically to store, manage, and query vector data. Vector data may represent geographic features such as points, lines, and polygons with a specific location and shape. Vector databases may store spatial data using vectors, which are comprised of coordinates and attributes. This type of database is optimized for storing, indexing, and querying vector data using spatial queries and operations. This allows for efficient storage and retrieval of multi-dimensional vectors, such as embeddings, for example. Vector databases may store data in a tabular format, with each row representing a specific feature and its attributes, and columns representing different properties of the feature.

Once the ML is trained, a user may provide a natural language input to UI 410. For example, the input may be as follows:

"Show me sports car 216D product lifecycle data in tabular view where start date between Apr. 1, 2023 and Jan. 31, 2024 group by phase name sort start date in ascending order and amount in descending order"

It should be noted that this phrase makes intuitive sense to the person entering it into the system, but such a statement is not, in this form, usable by a data store to provide the requested results. As such, the user generated phrase needs to be pre-processed into computer-based terms (e.g., SQL statements) in order for the data store to properly process the needed query or queries and provide meaningful results. Thus, a user skilled in the art of automobile production may not have the requisite computer language skills to generate the corresponding query to this statement.

The UI may interact with the user using a variety of techniques, such as receiving the user's voice in a microphone, outputting audio, keyboard input, touch screen input, and/or display output, for example.

Embedding model 411 receives the user input and outputs corresponding embedding vectors based on the training steps. At 412, keywords and keyword clusters are created. The embeddings are used to group together similar keywords such as "generate," "create," "show me," etc., while removing irrelevant keywords like "as," "is," "the," etc. The "Keyword Clustering" block 412 is part of the machine learning process. Clustering involves grouping similar items together. In this case, the system is clustering keywords based on their embeddings to identify topics or themes within the text. When similar keywords are grouped together, it is easier to analyze and understand the main topics or themes in the text data, for example. Accordingly, keyword clustering block 412 receives vectors representing keywords, uses a clustering algorithm (e.g., K-means, DBSCAN, or hierarchical clustering) to group the keywords based on their vector similarity, and outputs clusters of keywords that are semantically similar.

Remove Keyword block 413 is typically a software engineering step rather than a machine learning step. It involves filtering out certain keywords or clusters that are deemed irrelevant or redundant to clean the data by removing keywords or clusters that are not useful for further analysis. Remove keyword block 413 receives clusters of keywords, applies rules or criteria to identify and remove irrelevant or redundant keywords/clusters, and outputs a refined set of keywords/clusters for further processing. For example, if the text data includes keywords:

"Show me sports car 216D product lifecycle data in tabular view where start date between Apr. 1, 2023 and Jan. 31, 2024 group by phase name sort start date in ascending order and amount in descending order"

Figure 4B:
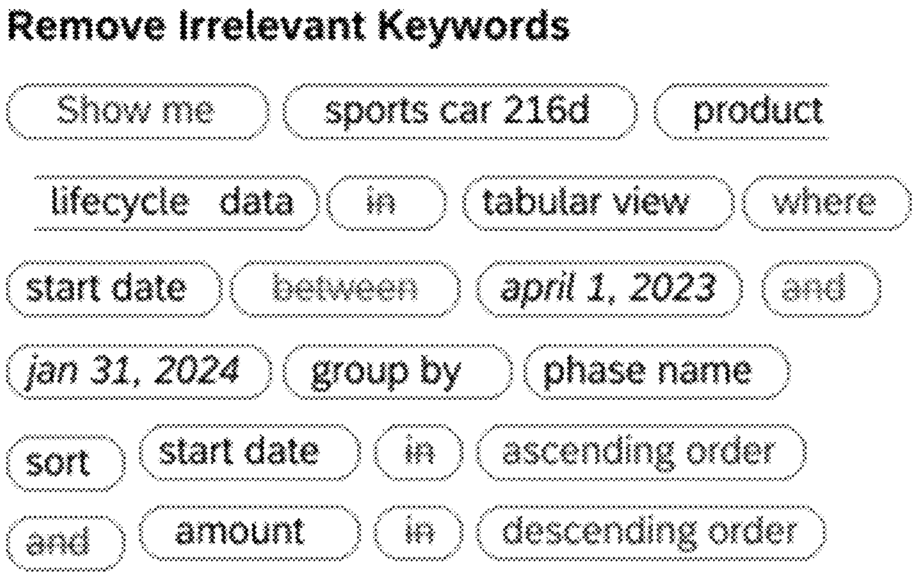
FIG. 4B illustrates an example word cluster according to another embodiment.

Keyword clustering 412 will cluster and remove unnecessary keywords in the following way.

sports car 216D|product lifecycle data|tabular view|start date|april 1, 2023|jan 31, 2024|phase name|sort|ascending order|amount|descending order|group by An example cluster with removed keywords is shown in FIG. 4B.

Next, the system may use the trained vector database to find related artifacts 414 (e.g., related to a particular output cluster of tokens). For example, the system may further attempt to match the closest SQL query, related front-end UI coding, visualizations, metadata from data store 450 (e.g., column names), and generate context for automatic generation of a query.

The following are illustrative examples of finding related artifacts by sending the cluster of tokens in FIG. 4B to the vector database.

Find related SQL for a particular cluster of tokens may retrieve, in response to the vector database receiving the cluster of tokens/keywords, the following:

SELECT * FROM employees WHERE department='Sales'

SELECT name FROM employees WHERE join_date BETWEEN '2019 Apr. 1' AND '2023 Jan. 31'

SELECT category, SUM (sales) FROM products GROUP BY category

Similarly, the cluster of tokens may be sent to the vector database and used to find the following related UI coding:

TableData=1
root: (branch: "br", details: "or details",
(branch: "Mech", details: "Mechanical Engg"},
|branch: "Elec", details: "Electrical Engg"},
1 branch: "Ece", details: "Electronics Engg"}, Similarly, the cluster of tokens may be sent to the vector database to retrieve the following view information and data store metadata (Column Name, Value, Syntax):

Tabular View
Hierarchical View
Network View
Timeline View
Phase Name

Amount
Contact person
Phase ID

Next, prompt engineering 415 uses a large language model (LLM) for query generation to correct and modify the query as necessary. In one example embodiment, the cluster of tokens (FIG. 4B), and related SQL, UI code, data store metadata, and visualizations are input to prompt engineering component 415. For instance, if a user is searching for data related to sports cars but the training set only contains data about employees, prompt engineering will adjust the query based on clustered keyword and fetches relevant data from the data store. Prompt engineering 415 involves designing prompts to elicit specific responses from an LLM. This can help in generating more accurate and relevant outputs from the model. Receiving the inputs from find related artifacts 414 (examples above), prompt engineering 415 uses an LLM to output a more refined query.

In this example, an LLM is used to generate SQL query based on relevant queries and key words. Features and advantages of the present disclosure include generating user interactive elements for a user query and send it to the LLM. The LLM generates the right SQL query based on a given prompt and also creates the right front-end coding to generate an HTML list for user interaction in specific keywords from user input, for example. An example output SQL query is as follows:

SELECT * FROM product_lifecycle_data WHERE product_name='sports car 216D' AND start_date >='2023 Apr. 1' AND start_date <='2024 Jan. 31' GROUP BY phase_name ORDER BY start_date ASC, amount DESC;

The following is the sample front end (i.e., client/UI) code used to represent the various parts of the output where some elements are interactive while others are not. The sample code contains classes that have the front end text formatting definitions. Separate classes are used to represent normal text as against text that the user can't interact with.

```
<m: columns>
<m: Column>
<m: Label text="Phase ID"/>
<m: Text text="{phaseModel>ID}"/>
</m: Column>
<m: Column>
<m: Label text="Phase Name"/>
<m: Text text="{phaseModel>Name}"/>
</m: Column>
```

At 416, the query is executed and a result is produced at 417. Input context modification, such as adjustments of the UI code for particular user input modes, of the query result occurs at 418. The query results and user input modifications are sent to UI 410 for presentation to the user.

FIG. 4C illustrates an example UI 480 according to another embodiment. UI 480 may be generated in a browser using portions of autogenerated UI code, for example, to modify particular elements of the UI. In this example, the query results (e.g., for "Sports Car 216D") are shown in UI pane 481. The tokenized cluster derived from the users NLP input is displayed in UI pane 482. Here, the system determined that certain tokenized words of the user's input correspond to data store attributes (e.g., column names or date ranges) and produces links that a user may select to change the query and generate other results. In this example, "Sports car 216D" token has a corresponding a link 451. When a user hovers over the link, for example, the system may show other similar options for the user to select (e.g., the system may display a sub-menu of other cars a user may select). Similarly, "Tabular View" token has a corresponding link 452. When a user hovers over the link, for example, the system may show view options for the user to select (e.g., grid list view, hierarchical view, network view, timeline view, and tabular view). Likewise, "Phase Name" token has a corresponding link 453 for changing the Group By parameter of a query. When a user hovers over the link, for example, the system may show group by options for the user to select (e.g., group by amount, contact person, phase ID, phase name, start date, or other data store attributes). In various embodiments, tokens corresponding to a variety of query parameters, such as sorting and filtering, may be presented as links. Accordingly, from a user's NLP input the system produces an interactive UI for the user to explore various data store content without having to write complex SQL code, UI code, views, and the like.

Figure 5:
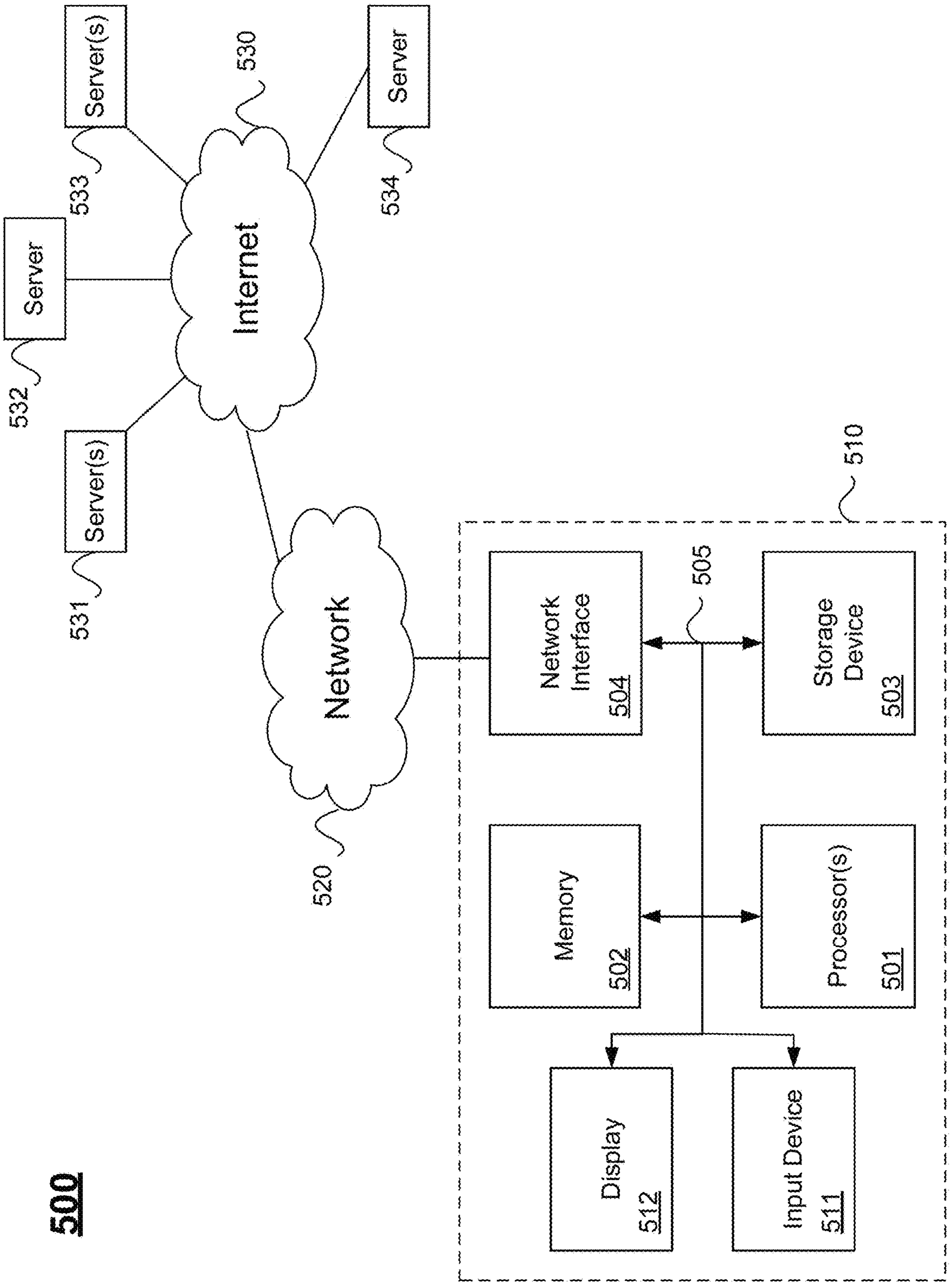
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

Figure 6A:
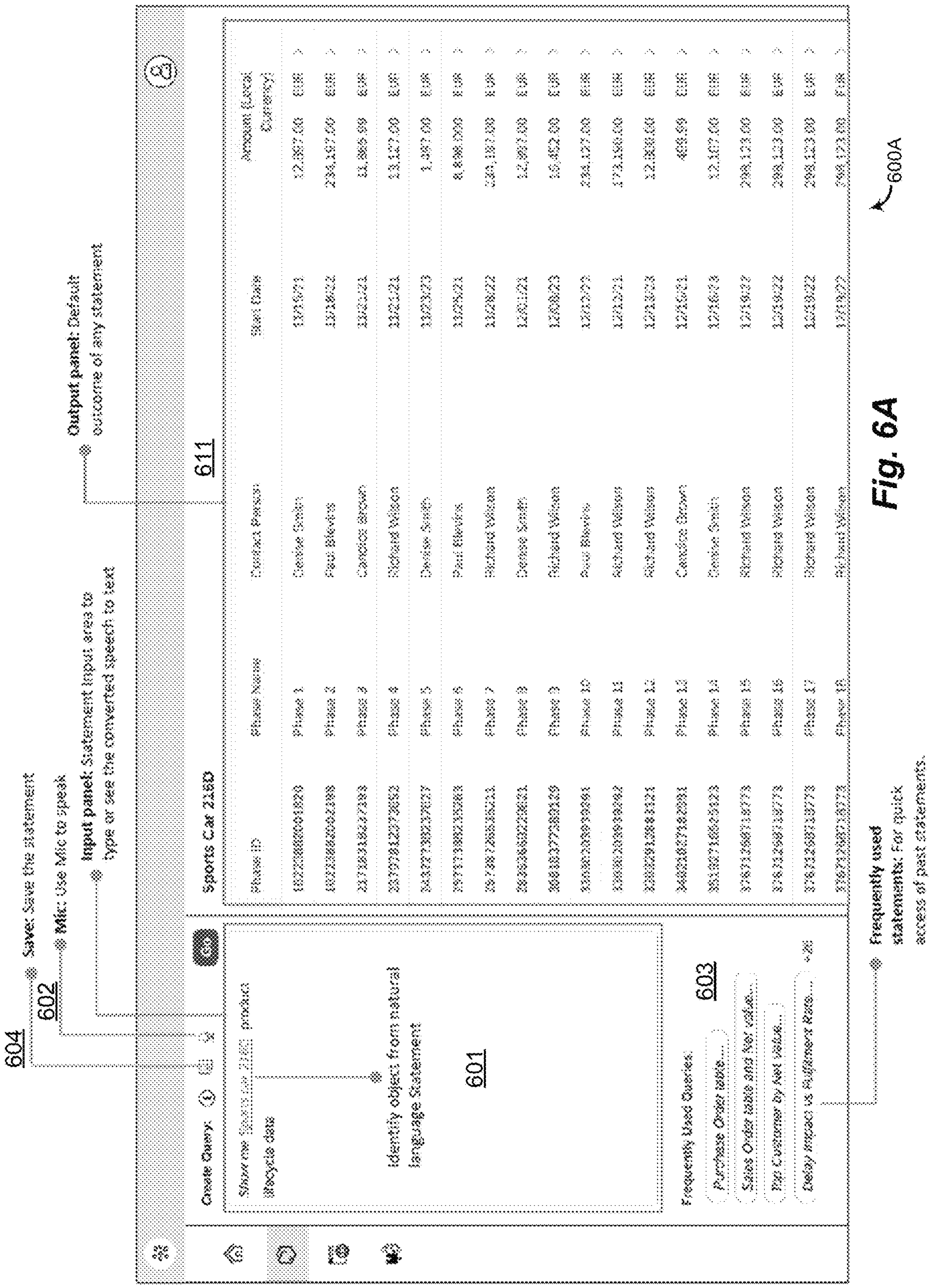
FIG. 6A illustrates a user interface according to an embodiment.

The following example user interfaces (UI) illustrate an innovation progression for analyzing data according to an embodiment. FIG. 6A illustrates a user interface 600 according to an embodiment. In various embodiments, a user may provide an input statement in natural language in an input panel 601 (e.g., by typing or pressing mic icon 602 and speaking). The user may save (604) the input statement and apply the input statement from a frequently used statement area 603. From the statement, the system identifies one or more keys, values, operators, objects, etc. The system may generate an interactive element for further updates to a search, for example. Executing the input statement (e.g., by selecting a "Go" button, not shown) may cause the system to execute a query and produce the results shown in the output panel 611 portion of user interface 600, which may display the default results (output) of an input statement.

Figure 6B:
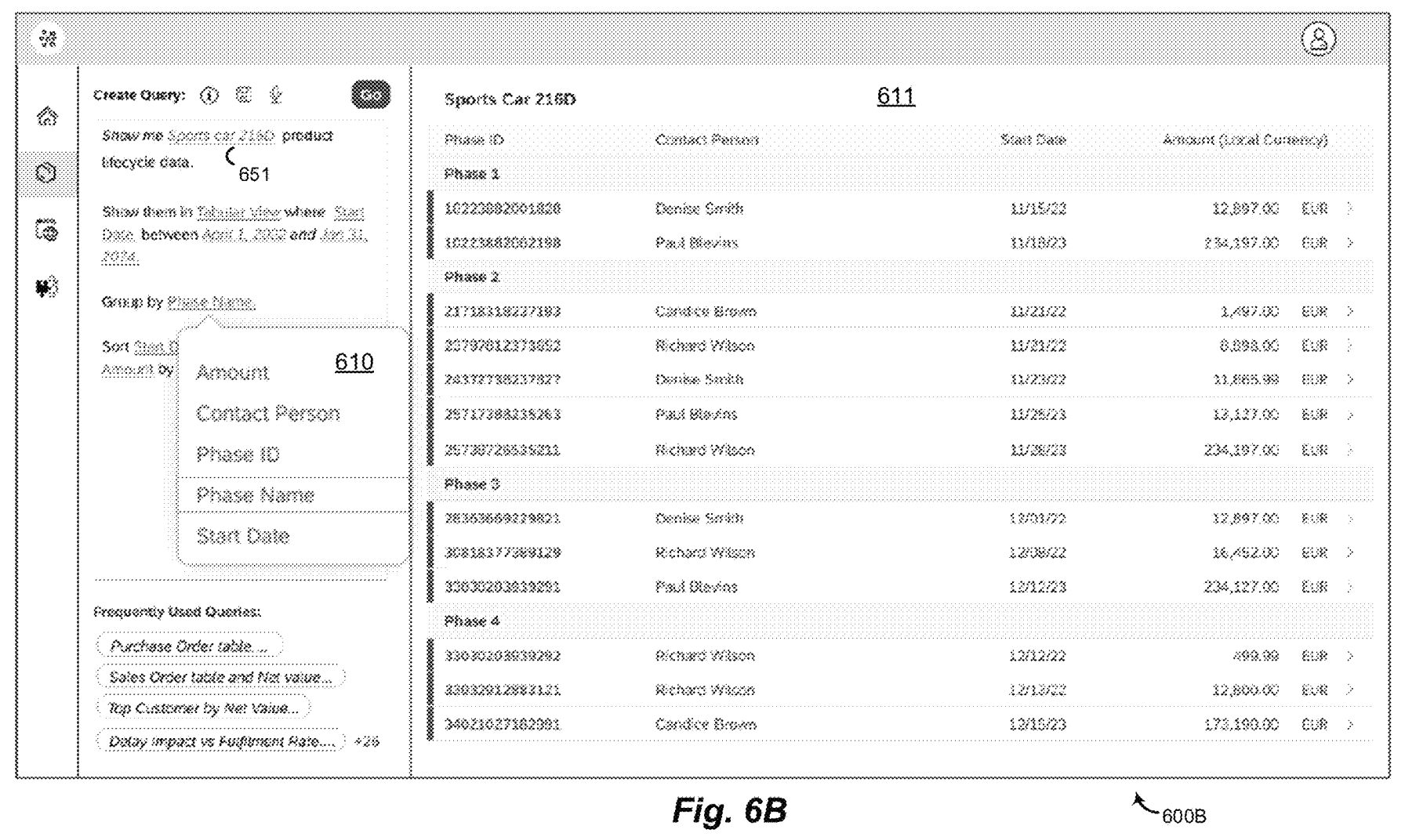
FIG. 6B illustrates a user interface according to an embodiment.

In this example, the user entered the input statement "Show me Sports car 216D product lifecycle data." Using the input statement, the system identifies an object (e.g., Sports care 216D) and creates a hyperlink for the object so that when it is clicked in UI 600 by a user, the system retrieves available objects as illustrated in FIG. 6B. FIG. 6B illustrates a UI 600B produced from UI 600. Embodiments of the present system may identify a key, values, and other elements from a user statement. The system may change them on-the-fly without impacting the existing input statement, which produces a fluid, advantageous data analysis experience. In this example, the user may change the "group by" column name to another column in the particular table, which the UI 600B may display as a menu 610. Once a user selects a column name, the output is automatically updated at 611 to show the other available columns in the table. Similarly, the user may select the "Sports care 216D" link 651 and select another sports car object (menu not shown).

Figure 6C:
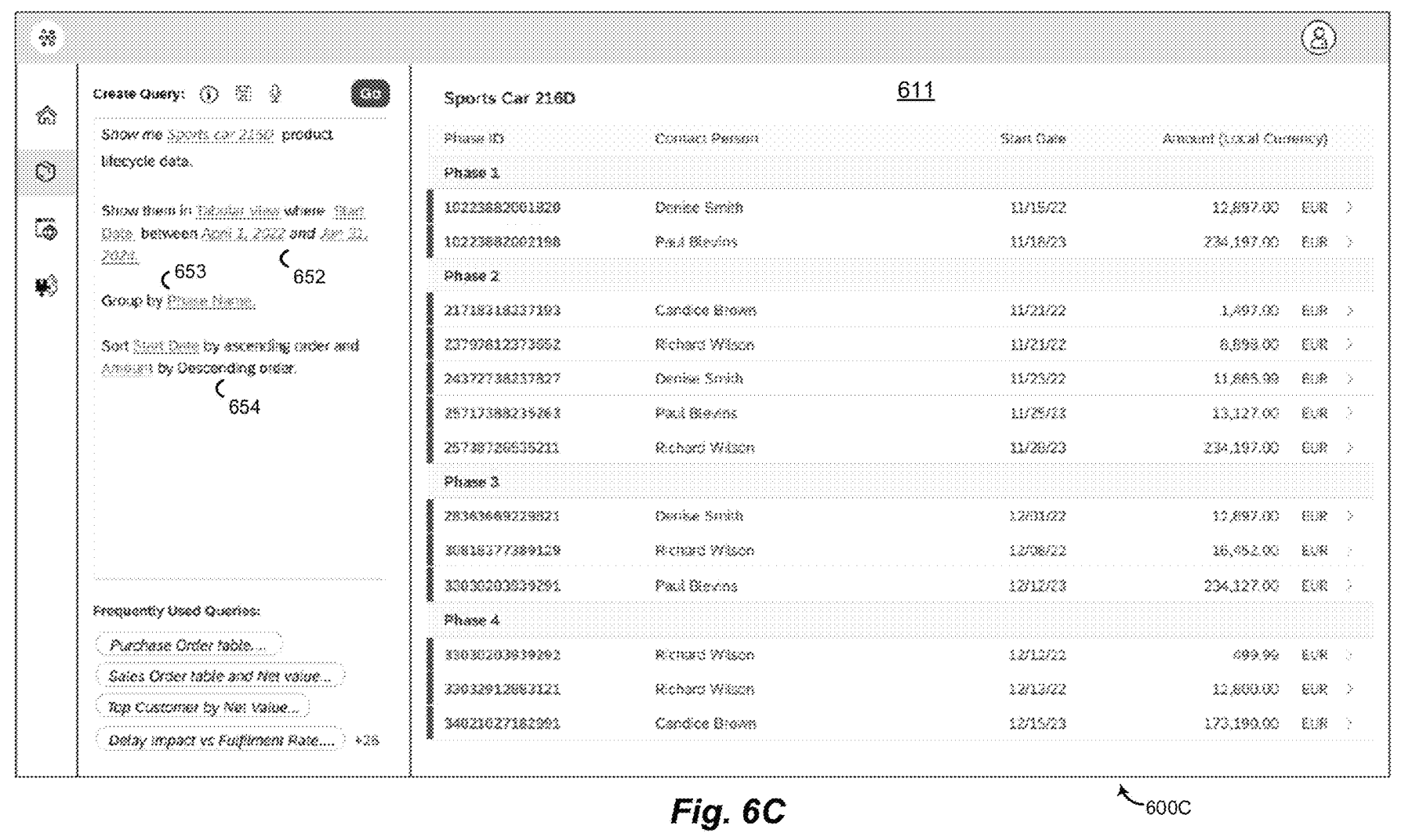
FIG. 6C illustrates a user interface according to an embodiment.

FIG. 6C illustrates other elements of a user interface according to an embodiment. In various embodiments, additional types of input statements may include filtering, grouping, sorting, searching (querying), or arranging data. For example, some input statements (652) may produce filters from a natural language input (e.g., Show data where Start Date between Apr. 1, 2002 and Jan. 31, 2024). Input statement 653 is an example of organizing and visualizing data by grouping or segmenting. Input statement 654 may allow a user to sort data in ascending or descending order (when supported by the database or table). As mentioned above, input statements may be used to search data. In some embodiments, any of a wide variety of search options may be implemented using natural language according to the techniques described herein. Furthermore, in some embodiments, the output may be modified based on user inputs. For example, in some embodiments, a user may arrange columns of data in output panel 611 by entering an input statement configured to support data arrangement functionality using the techniques described above. Accordingly, while particular inputs are shown converted into links and associated with other related objects, the examples shown herein are not limiting.

Figure 6D:
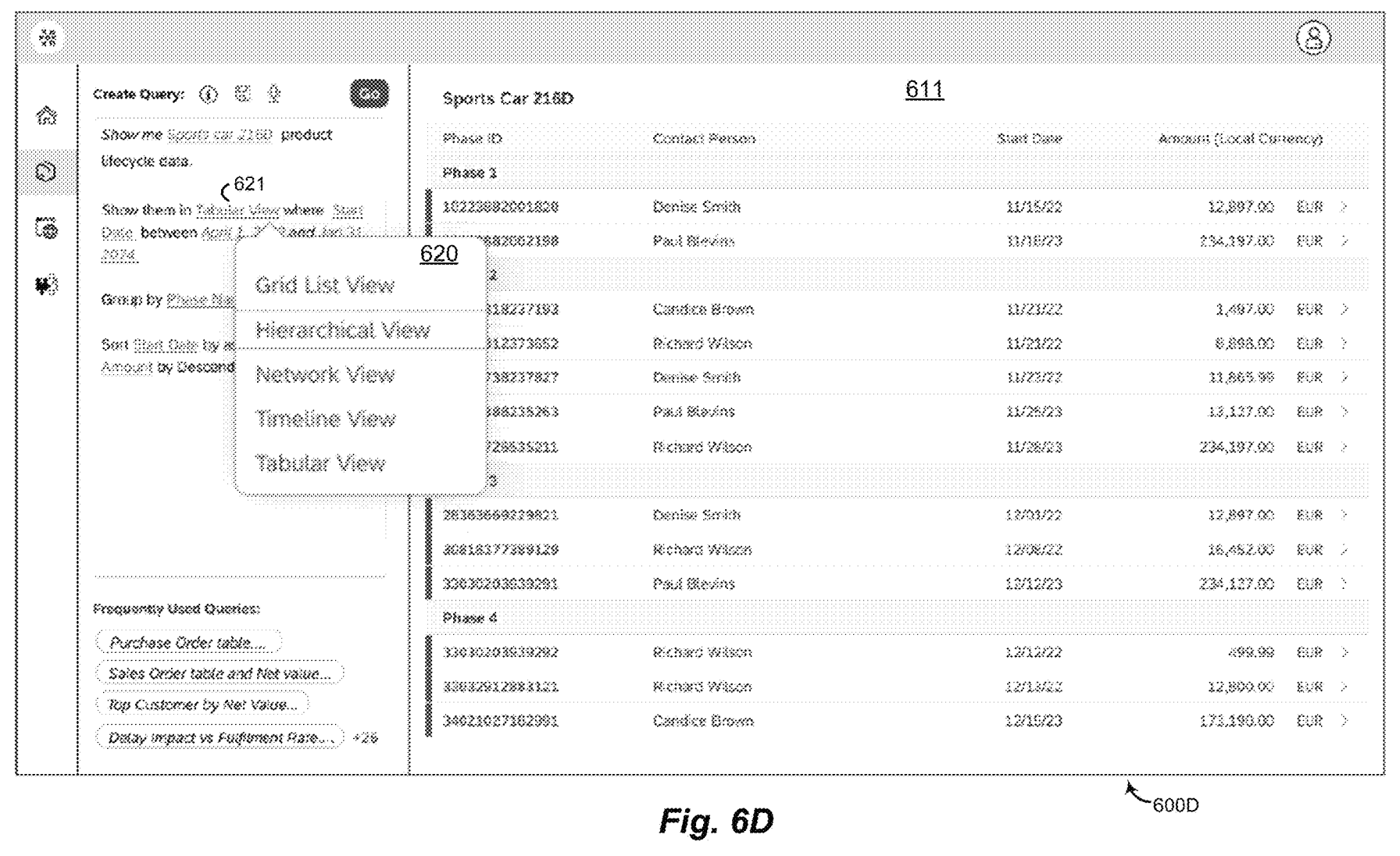
FIG. 6D illustrates a user interface according to an embodiment.
Figure 6E:
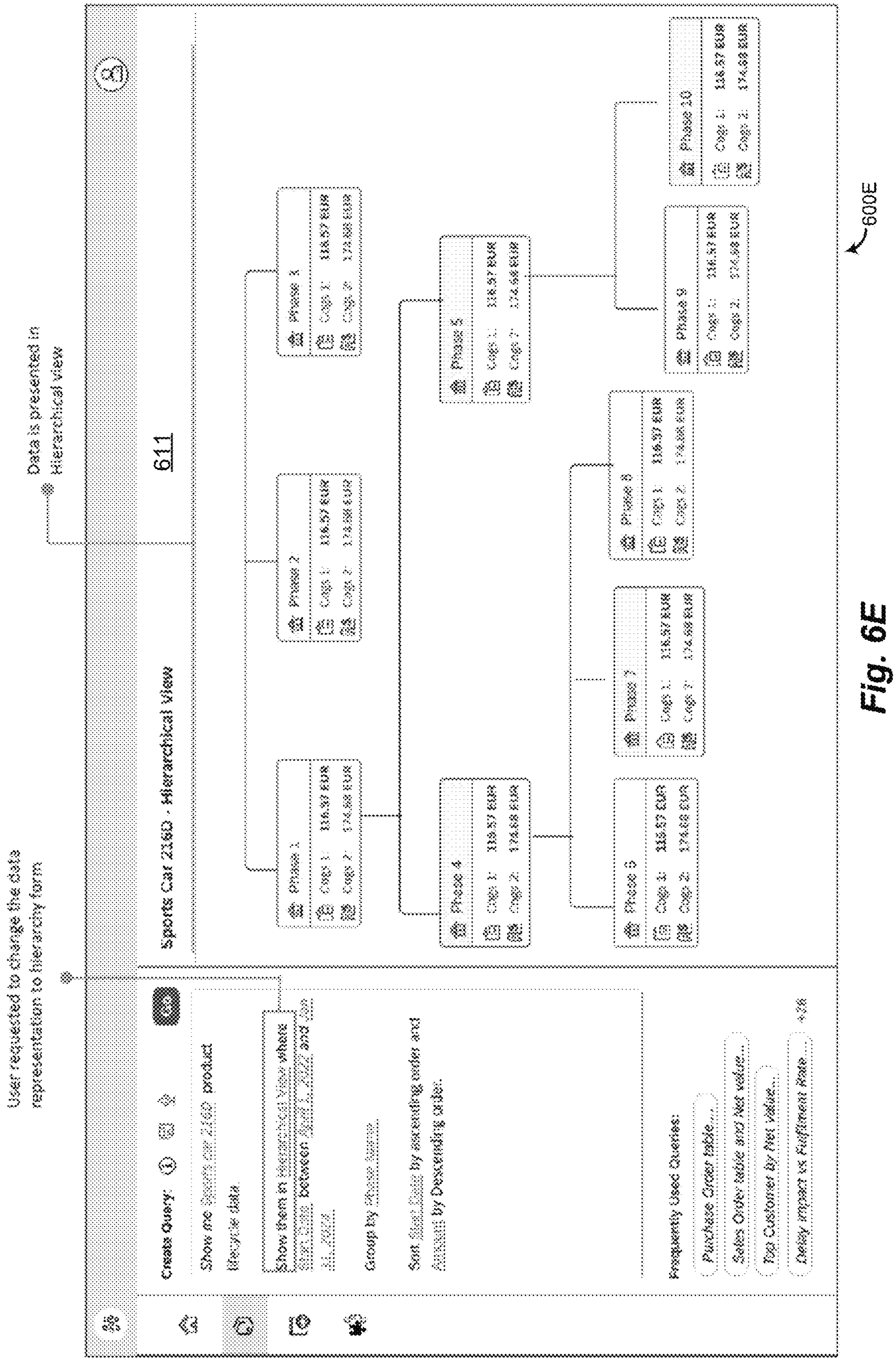
FIG. 6E illustrates a user interface according to an embodiment.

FIG. 6D illustrates an example UI 600D according to an embodiment. In this example, elements of the UI may be used to change the data presentation. For example, initially, a user may request output results in a tabular form at 621 ("Show them in Tabular view . . . ") or the computer system may have a default setting to display results in a particular (e.g., table) format (see FIG. 6A). In this example, a pop up menu 620 is generated showing the list of other available views (Grid List, Hierarchical, Network, Timeline, and Tabular) as determined using the techniques described above. A user may change output 611 from Tabular view to Hierarchical view, for example, without changing the existing statement or entering a new statement. Similarly, based on the request, the user may change the output 611 to display any other supported presentation, such as network map, bubble chart, candle graph, Gannt, geographical as yet more examples, based on the presentation types and data supported by the implementation. As illustrated in FIG. 6E, a user may select Hierarchical view to produce an output presentation as shown in output 611 in UI 600E.

FIG. 7 illustrates an example process flow according to an embodiment. The process begins at 701, where a UI is displayed to a user. The UI may comprise an input statement portion and an output portion. At 702, an input statement is received by the system (e.g., a natural language input entered via a keyboard or microphone). At 703, the user input statement is displayed in the input statement portion of the UI. At 704, the input statement is processed and a query is generated according to the techniques described herein. At 705, query results are displayed in the output portion of the UI. At 706, the processing of the input statement resulted in one or more words of the input statement being converted to links to related tokens. At 707, the tokens associated with one or more words of the input statement are displayed (e.g., in response to the user hovering over a link) in the input statement portion of the UI. At 708, a user selection of the displayed tokens is received. At 709, the output portion of the UI is modified based on the selected token.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform methods as described herein and in the following examples. In another embodiment, the present disclosure includes a non-transitory computer-readable medium storing computer-executable instructions that, when executed by at least one processor, perform the methods as described herein and in the following examples.

In one embodiment, the present disclosure includes a method of querying an analytic database comprising: training a machine learning model with a data set comprising a plurality of natural language inputs to said analytic database and a corresponding plurality of SQL queries, and a plurality of column names from the analytic database, wherein the machine learning model is trained to convert one or more words of the natural language inputs into tokens corresponding to the column names in the analytic database and associate the tokens with metadata attributes in the analytic database; receiving a first natural language input in the machine learning model; generating, based on an output of the machine learning model, a first SQL query; processing the first SQL query in the analytic database to produce first query results; in a user interface, displaying the first natural language input and the first query results, wherein one or more words of the first natural language input corresponding to one or more tokens identified by the machine learning model as one or more corresponding column names are displayed as one or more links, wherein the links are associated with a plurality of corresponding metadata attributes in the analytic database; and selecting, by a user, at least one of said one or more links to automatically generate a second SQL query to the analytic database to produce second query results based on the selection.

In one embodiment, the data set further comprises user interface code to train the machine learning model.

In one embodiment, the data set further comprises user a plurality of visualizations to train the machine learning model.

In one embodiment, the method further comprises, automatically generating, by the machine learning model, user interface code to produce the user interface based on the first natural language input.

In one embodiment, the machine learning model comprises a vector database.

In one embodiment, the machine learning model comprises an embedding model, wherein said generating, based on an output of the machine learning model, a first SQL query comprises converting the first natural language input into tokens using an embedding model.

In one embodiment, said generating, based on an output of the machine learning model, a first SQL query comprises: converting the first natural language input into tokens; and determining, by the machine learning model, related SQL statements, user interface code, and related visualizations based on the tokens.

In one embodiment, said generating, based on an output of the machine learning model, a first SQL query further comprises: sending, to a large language model, the tokens, the related SQL statements, the user interface code, and the related visualizations; and receiving, from the large language model, the first SQL query and user interface code to generate the user interface.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of querying an analytic database comprising:

training a machine learning model with a data set comprising a plurality of natural language inputs to said analytic database and a corresponding plurality of SQL queries, and a plurality of column names from the analytic database, wherein the machine learning model is trained to convert one or more words of the natural language inputs into tokens corresponding to the column names in the analytic database and associate the tokens with metadata attributes in the analytic database;

receiving a first natural language input in the machine learning model;

generating, based on an output of the machine learning model, a first SQL query;

processing the first SQL query in the analytic database to produce first query results;

in a user interface, displaying the first natural language input and the first query results, wherein one or more words of the first natural language input corresponding to one or more tokens identified by the machine learning model as one or more corresponding column names are displayed as one or more links, wherein the links are associated with a plurality of corresponding metadata attributes in the analytic database; and selecting, by a user, at least one of said one or more links to automatically generate a second SQL query to the analytic database to produce second query results based on the selection.

2. The method of claim 1, wherein the data set further comprises user interface code to train the machine learning model.

3. The method of claim 1, wherein the data set further comprises user a plurality of visualizations to train the machine learning model.

4. The method of claim 1, further comprising, automatically generating, by the machine learning model, user interface code to produce the user interface based on the first natural language input.

5. The method of claim 1, wherein the machine learning model comprises a vector database.

6. The method of claim 1, wherein the machine learning model comprises an embedding model, wherein said generating, based on an output of the machine learning model, a first SQL query comprises converting the first natural language input into tokens using an embedding model.

7. The method of claim 1, wherein said generating, based on an output of the machine learning model, a first SQL query comprises:

converting the first natural language input into tokens; and determining, by the machine learning model, related SQL statements, user interface code, and related visualizations based on the tokens.

8. The method of claim 7, wherein said generating, based on an output of the machine learning model, a first SQL query further comprises:

sending, to a large language model, the tokens, the related SQL statements, the user interface code, and the related visualizations; and receiving, from the large language model, the first SQL query and user interface code to generate the user interface.

9. A computer system comprising:

at least one processor;

at least one non-transitory computer-readable medium storing computer-executable instructions that, when executed by the at least one processor, cause the computer system to perform a method comprising:

training a machine learning model with a data set comprising a plurality of natural language inputs to said analytic database and a corresponding plurality of SQL queries, and a plurality of column names from the analytic database, wherein the machine learning model is trained to convert one or more words of the natural language inputs into tokens corresponding to the column names in the analytic database and associate the tokens with metadata attributes in the analytic database;

receiving a first natural language input in the machine learning model;

generating, based on an output of the machine learning model, a first SQL query;

processing the first SQL query in the analytic database to produce first query results;

in a user interface, displaying the first natural language input and the first query results, wherein one or more words of the first natural language input corresponding to one or more tokens identified by the machine learning model as one or more corresponding column names are displayed as one or more links, wherein the links are associated with a plurality of corresponding metadata attributes in the analytic database; and selecting, by a user, at least one of said one or more links to automatically generate a second SQL query to the analytic database to produce second query results based on the selection.

10. The computer system of claim 9, wherein the data set further comprises user interface code to train the machine learning model.

11. The computer system of claim 9, wherein the data set further comprises user a plurality of visualizations to train the machine learning model.

12. The computer system of claim 9, wherein the machine learning model comprises a vector database.

13. The computer system of claim 9, wherein the machine learning model comprises an embedding model, wherein said generating, based on an output of the machine learning model, a first SQL query comprises converting the first natural language input into tokens using an embedding model.

14. The computer system of claim 9, wherein said generating, based on an output of the machine learning model, a first SQL query comprises:

converting the first natural language input into tokens;

determining, by the machine learning model, related SQL statements, user interface code, and related visualizations based on the tokens;

sending, to a large language model, the tokens, the related SQL statements, the user interface code, and the related visualizations; and receiving, from the large language model, the first SQL query and user interface code to generate the user interface.

15. A non-transitory computer-readable medium storing computer-executable instructions that, when executed by at least one processor, perform a method comprising:

training a machine learning model with a data set comprising a plurality of natural language inputs to said analytic database and a corresponding plurality of SQL queries, and a plurality of column names from the analytic database, wherein the machine learning model is trained to convert one or more words of the natural language inputs into tokens corresponding to the column names in the analytic database and associate the tokens with metadata attributes in the analytic database;

receiving a first natural language input in the machine learning model;

generating, based on an output of the machine learning model, a first SQL query;

processing the first SQL query in the analytic database to produce first query results;

in a user interface, displaying the first natural language input and the first query results, wherein one or more words of the first natural language input corresponding to one or more tokens identified by the machine learning model as one or more corresponding column names are displayed as one or more links, wherein the links are associated with a plurality of corresponding metadata attributes in the analytic database; and selecting, by a user, at least one of said one or more links to automatically generate a second SQL query to the analytic database to produce second query results based on the selection.

16. The non-transitory computer-readable medium of claim 15, wherein the data set further comprises user interface code to train the machine learning model.

17. The non-transitory computer-readable medium of claim 15, wherein the data set further comprises user a plurality of visualizations to train the machine learning model.

18. The non-transitory computer-readable medium of claim 15, wherein the machine learning model comprises a vector database.

19. The non-transitory computer-readable medium of claim 15, wherein the machine learning model comprises an embedding model, wherein said generating, based on an output of the machine learning model, a first SQL query comprises converting the first natural language input into tokens using an embedding model.

20. The non-transitory computer-readable medium of claim 15, wherein said generating, based on an output of the machine learning model, a first SQL query comprises:

converting the first natural language input into tokens;

determining, by the machine learning model, related SQL statements, user interface code, and related visualizations based on the tokens;

sending, to a large language model, the tokens, the related SQL statements, the user interface code, and the related visualizations; and receiving, from the large language model, the first SQL query and user interface code to generate the user interface.

* * * * *